United States Patent
Tsu et al.

(10) Patent No.: US 10,461,624 B2
(45) Date of Patent: Oct. 29, 2019

(54) POWER SWITCH CONTROL CIRCUIT AND OPEN DETECTION METHOD THEREOF

(71) Applicant: RICHTEK TECHNOLOGY CORPORATION, Zhubei, HsinChu (TW)

(72) Inventors: Pei-Sheng Tsu, HsinChu (TW); Chien-Fu Tang, HsinChu (TW); Isaac Y. Chen, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 109 days.

(21) Appl. No.: 15/485,226

(22) Filed: Apr. 11, 2017

(65) Prior Publication Data

US 2018/0138797 A1 May 17, 2018

(30) Foreign Application Priority Data

Nov. 17, 2016 (CN) ............... 2016 1 1011896

(51) Int. Cl.
| | |
|---|---|
| *H02M 1/08* | (2006.01) |
| *H02H 9/02* | (2006.01) |
| *H02M 3/335* | (2006.01) |
| *H02M 1/32* | (2007.01) |
| *H02M 1/00* | (2006.01) |

(52) U.S. Cl.
CPC ............. *H02M 1/08* (2013.01); *H02H 9/02* (2013.01); *H02M 3/33523* (2013.01); *H02M 3/33592* (2013.01); *H02M 1/32* (2013.01); *H02M 2001/0029* (2013.01); *Y02B 70/1475* (2013.01)

(58) Field of Classification Search
CPC ..... H02M 1/08; H02M 3/335; H02M 3/33523
USPC ......................................... 307/131
See application file for complete search history.

(56) References Cited

U.S. PATENT DOCUMENTS

| | | | | |
|---|---|---|---|---|
| 6,456,511 | B1 * | 9/2002 | Wong ............... | H02M 1/36 363/21.13 |
| 10,038,385 | B2 * | 7/2018 | Chen ................ | H02M 1/08 |
| 2005/0270807 | A1 * | 12/2005 | Strijker ............ | H02M 3/33507 363/21.01 |
| 2006/0208789 | A1 * | 9/2006 | Shimada ........... | H02M 3/157 327/540 |
| 2014/0009974 | A1 * | 1/2014 | Shen ................. | H02M 3/33515 363/21.13 |

(Continued)

*Primary Examiner* — Adi Amrany
(74) *Attorney, Agent, or Firm* — Tung & Associates (57) ABSTRACT

The present invention provides a power switch control circuit and an open detection method thereof. The power switch control circuit is for generating an operation signal at an operation signal output pin according to an input signal, wherein the operation signal is for operating a power switch. The power switch control circuit includes: a current injection circuit, which is connected to the operation signal output pin, and provides a predetermined current to the operation signal output pin according to an enable signal; and an open detection circuit, which is coupled to the current injection circuit, and determines whether a connection between the operation signal output pin and the power switch is open according to a level of the operation signal output pin at a detection time point or according to a level variation of the operation signal output pin during a detection time period, whereby an open detection signal is generated.

4 Claims, 4 Drawing Sheets

(56) References Cited

U.S. PATENT DOCUMENTS

| | | | |
|---|---|---|---|
| 2014/0056036 A1* | 2/2014 | Pan | H02M 7/217 363/21.12 |
| 2014/0160801 A1* | 6/2014 | Stamm | H05B 33/0815 363/21.01 |
| 2014/0355314 A1* | 12/2014 | Ryan | H02M 3/33507 363/21.01 |
| 2015/0016151 A1* | 1/2015 | Bhasin | H02M 1/08 363/20 |
| 2016/0072384 A1* | 3/2016 | Fan | H02M 3/156 323/282 |
| 2016/0308447 A1* | 10/2016 | Chen | H02M 1/4258 |
| 2017/0373603 A1* | 12/2017 | Basso | H02H 3/20 |
| 2018/0083540 A1* | 3/2018 | Pham | H02M 1/08 |

* cited by examiner

POWER SWITCH CONTROL CIRCUIT AND OPEN DETECTION METHOD THEREOF

CROSS REFERENCE

The present invention claims priority to CN 201611011896.9, filed on Nov. 17, 2016.

BACKGROUND OF THE INVENTION

Field of Invention

The present invention relates to a power switch control circuit and an open detection method thereof; particularly, it relates to such a power switch control circuit which detects whether an open condition occurs between an operation signal output pin and a power switch, and an open detection method thereof.

Description of Related Art

Figure 1A:
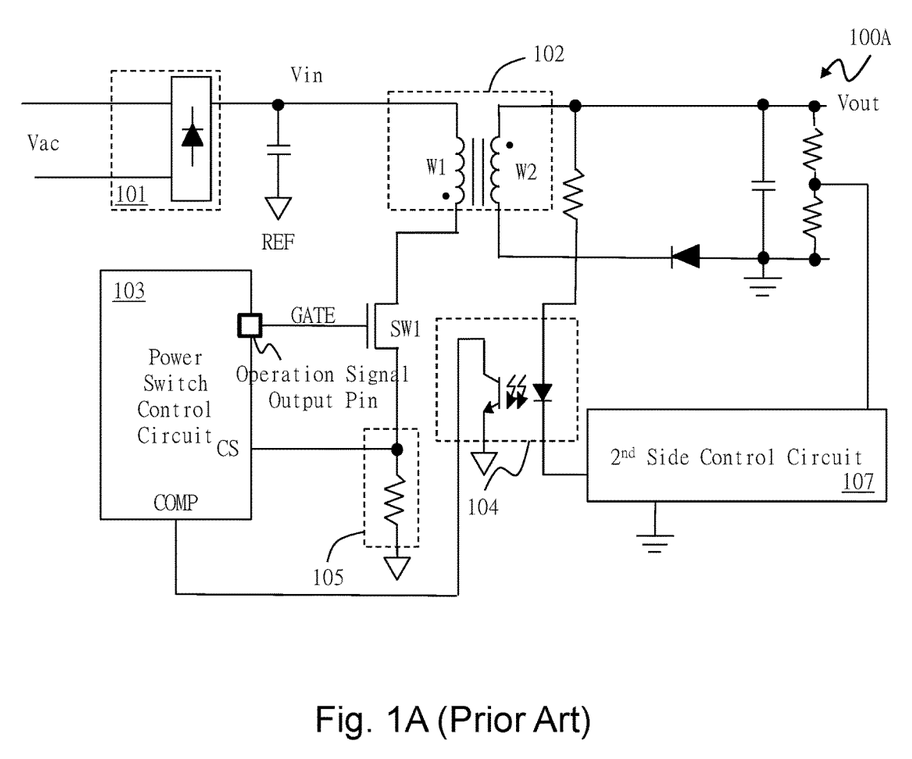
FIG. 1A shows a schematic diagram of a conventional switching regulator 100A.

FIG. 1A shows a schematic diagram of a conventional switching regulator 100A which is an isolated power supply circuit with a transformer. As shown in FIG. 1, a rectifier circuit 101 rectifies an alternating current (AC) voltage Vac to generate an input voltage Vin. The rectifier circuit 101 is for example a bridge rectifier circuit. A primary winding W1 of a transformer 102 of the switching regulator 100A receives the input voltage Vin. A power switch SW1 controls a conduction time of the primary winding W1, whereby the input voltage Vin is converted to an output voltage Vout generated at a secondary winding W2 of the transformer 102. The switching regulator 100A includes the aforementioned transformer 102, the power switch SW1, a power switch control circuit 103, an opto-coupler circuit 104, a current sense circuit 105, and a second side control circuit 107. The power switch SW1 is controlled by the power switch control circuit 103. The power switch control circuit 103 obtains a feedback voltage signal COMP related to the output voltage Vout from the opto-coupler circuit 104, and obtains a current sense signal CS related to a current flowing through the power switch SW1 from the current sense circuit 105, and by feedback control, the power switch control circuit 103 generates an input signal which is typically a pulse width modulation (PWM) signal. ("Input signal" is from the perspective of the output buffer stage.) The power switch control circuit 103 generates an operation signal GATE at an operation signal output pin according to the PWM signal (thus, the operation signal is a PWM signal having a waveform corresponding to the input signal but having adjusted voltage levels), to control the power switch SW1. The secondary side control circuit 107 controls the opto-coupler circuit 104 to generate the feedback voltage signal COMP according to a divided voltage of the output voltage Vout.

Figure 1B:
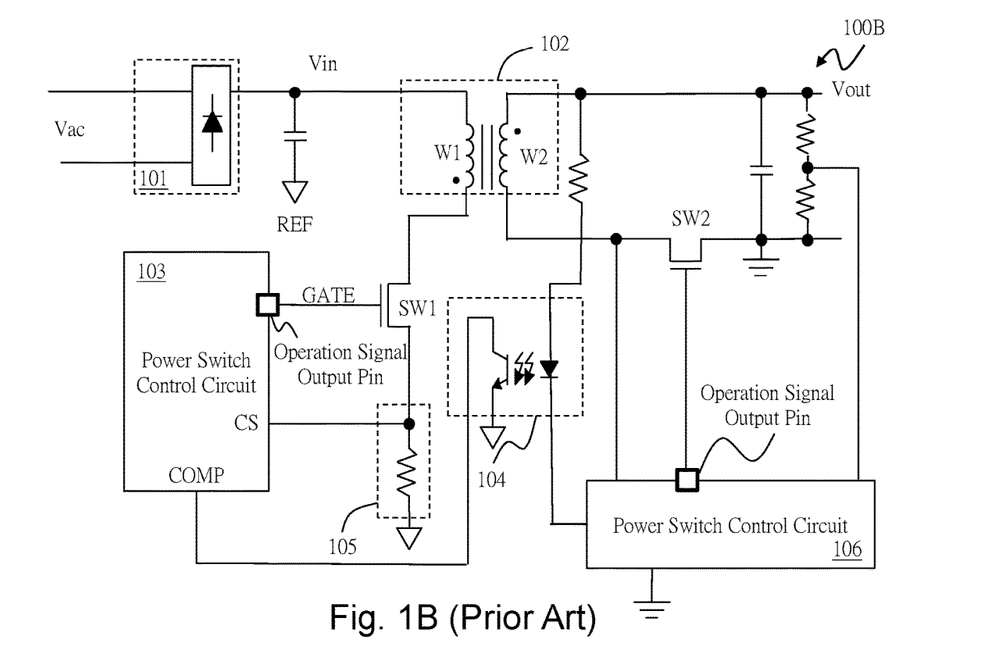
FIG. 1B shows another schematic diagram of a conventional switching regulator 100B.

Referring to FIG. 1B, in a switching regulator 100B, asynchronous rectification (SR) switch SW2 replaces the diode of the switching regulator 100A at the secondary side, whereby the voltage drop across the diode is removed to increase power conversion efficiency. A power switch control circuit 106 at the secondary side controls the SR switch SW2 through an operation signal output pin, such that when the primary winding W1 is not conductive, the SR switch SW2 is conductive, and the secondary winding W2 releases power, to convert the input voltage Vin to the output voltage Vout.

In the switching regulator 100B shown in FIG. 1B, an open condition may occur between the SR switch SW2 and the operation signal output pin of the power switch control circuit 106 for a certain reason, such that the power switch control circuit 106 cannot control the SR switch SW2 correctly. However, because the SR switch SW2 includes a parasitic diode, when the SR switch SW2 is turned OFF, the secondary side still forms a conductive circuit loop through the parasitic diode. Thus, even though the power switch control circuit 106 does not control the SR switch SW2 correctly, it cannot be detected because the circuit loop at the secondary side is still conductive. This problem may cause the switching regulator 100B to operate incorrectly, lowering the power conversion efficiency, or worse, damaging the switching regulator 100B and leading to a hazardous condition.

In view of the above, the present invention proposes a power switch control circuit and an open detection method thereof, which can detect the open condition between the operation signal output pin and the power switch, so as to increase the power conversion efficiency and to ensure safety. The present invention can be applied not only to the secondary side but also to the primary side of the transformer in an isolated power supply circuit. The present invention also can be applied to other type of switching regulators, to detect whether there is an open circuit between a power switch and its control circuit.

SUMMARY OF THE INVENTION

From one perspective, the present invention provides a power switch control circuit, configured to operably generate an operation signal at an operation signal output pin therein according to an input signal, so as to control a power switch, the power switch control circuit comprising: a current injection circuit, which is connected to the operation signal output pin, and is configured to operably provide a predetermined current to the operation signal output pin according to an enable signal; and an open detection circuit, which is coupled to the current injection circuit, and is configured to operably determine whether a connection between the operation signal output pin and the power switch is open according to a level of the operation signal output pin at a detection time point or during a detection time period, or according to a level variation of the operation signal output pin during a detection time period, and to generate an open detection signal accordingly.

In one preferable embodiment, the power switch control further comprises an inrush current protection circuit, which is coupled to the operation signal output pin, and is configured to operably clamp a level of the operation signal output pin when the predetermined current is provided to the operation signal output pin, such that the level does not exceed an upper limit.

In one preferable embodiment, the input signal is transmitted to the operation signal output pin through a driver circuit which includes a half-bridge circuit, wherein the half-bridge circuit includes: an upper switch and a lower switch connected at a common node; an upper buffer, which is configured to operably control the upper switch according to the input signal; and a lower buffer, which is configured to operably control the lower switch according to the input signal, wherein the upper switch and the lower switch are transistors with opposite conductive types, or are transistors with a same conductive type wherein one and only one of the upper buffer and the lower buffer is an inverter buffer; wherein the inrush current protection circuit includes: the lower switch; and a switch, which is electrically connected between a gate and a current inflow terminal of the lower switch, and is controlled by the enable signal; wherein when the enable signal is at an enable state, the lower switch forms a diode clamper circuit.

In one preferable embodiment, the open detection circuit includes: a comparison circuit, which is coupled to the operation signal output pin, and is configured to operably compare the level of the operation signal output pin with a reference level, so as to generate a comparison signal indicating whether the connection between the operation signal output pin and the power switch is open; and a latch circuit, which is coupled to the comparison circuit, and is configured to operably latch the comparison signal to generate the open detection signal.

In one preferable embodiment, the open detection circuit determines whether a connection between the operation signal output pin and the power switch is open and generates the open detection signal according to the level of the operation signal output pin at the detection time point, a highest level of the operation signal output pin during the detection time period, the level variation of the operation signal output pin during the detection time period, or a time length for the level of the operation signal output pin to achieve a predetermined level.

In one preferable embodiment, the operation signal is a PWM signal, and the operation signal is at a low level at the detection time point or during the detection time period.

From another perspective, the present invention provides an open detection method of a power switch control circuit, wherein the power switch control circuit is configured to operably generate an operation signal at an operation signal output pin therein according to an input signal to control a power switch, and the open detection method is for determining whether a connection between the operation signal output pin and the power switch is open, the open detection method comprising: providing a predetermined current to the operation signal output pin according to an enable signal; and determining whether a connection between the operation signal output pin and the power switch is open according to a level of the operation signal output pin at a detection time point or during a detection time period, or according to a level variation of the operation signal output pin during a detection time period, and generating an open detection signal accordingly.

In one preferable embodiment, the open detection method further includes: clamping a level of the operation signal output pin when the predetermined current is provided to the operation signal output pin, such that the level does not exceed an upper limit.

In one preferable embodiment, the step of determining whether the connection between the operation signal output pin and the power switch is open and generating the open detection signal accordingly, includes: comparing the level of the operation signal output pin with a reference level, to generate a comparison signal, for determining whether the connection between the operation signal output pin and the power switch is open; and latching the comparison signal to generate the open detection signal.

In one preferable embodiment, the step of determining whether the connection between the operation signal output pin and the power switch is open to generate the open detection signal, further includes: determining whether the connection between the operation signal output pin and the power switch is open and generating the open detection signal according to the level of the operation signal output pin at the detection time point, a highest level of the operation signal output pin during the detection time period, the level variation of the operation signal output pin during the detection time period, or a time length for the level of the operation signal output pin to achieve a predetermined level.

In one preferable embodiment, the operation signal is a PWM signal, and the operation signal is at a low level at the detection time point or during the detection time period.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
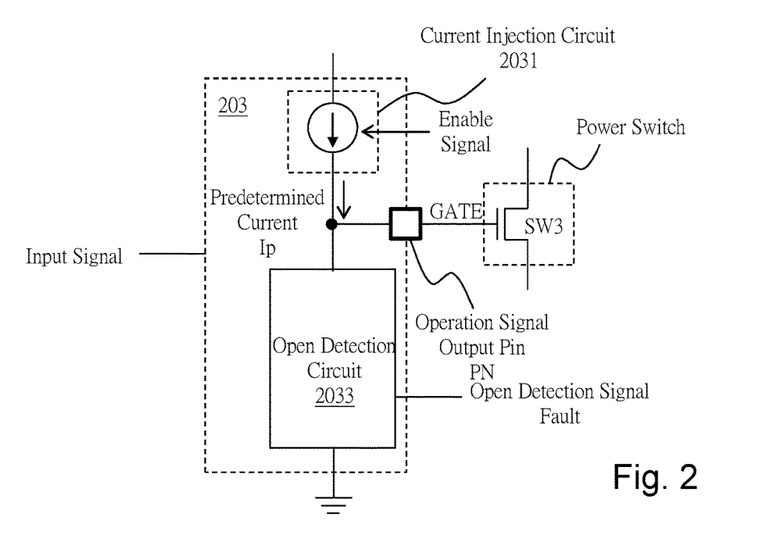
FIG. 2 shows an embodiment of a power switch control circuit 203 according to the present invention.

FIG. 2 shows an embodiment of a power switch control circuit 203 of the present invention. As shown in FIG. 2, the power switch control circuit 203 generates an operation signal GATE at an operation signal output pin PN therein according to an input signal, to control a power switch SW3. The power switch control circuit 203 includes a current injection circuit 2031 and an open detection circuit 2033. The power switch control circuit 203 may be applied in for example but not limited to the power switch control circuit 103 and/or 106. The power switch SW3 is for example but not limited to a power switch at the primary side of the isolated power supply circuit (such as the power switch SW1 of the switching regulator 100A in FIG. 1A), a synchronous rectifier switch at the secondary side (such as the SR switch SW2 of the switching regulator 100B in FIG. 1B), or a power switch of a switching regulator in any other form (such as a synchronous or asynchronous buck, boost, inverting, buck-boost, or inverting-boost power converter).

In this embodiment, the current injection circuit 2031 is connected to the operation signal output pin PN, and provides a predetermined current Ip to the operation signal output pin PN according to an enable signal Enable. The current injection circuit 2031 is for example but not limited to a current source circuit. When the enable signal Enable enables the current source circuit, the current source circuit provides the predetermined current Ip to the operation signal output pin PN. In another embodiment, the current injection circuit 2031 may include a current source circuit and a switch connected in series, and when the enable signal Enable turns ON the switch, the current source circuit provides the predetermined current Ip to the operation signal output pin PN. The open detection circuit 2033 is coupled to the current injection circuit 2031. The open detection circuit 2033 determines whether a connection between the operation signal output pin PN and the power switch SW3 is open according to a level of the operation signal output pin PN at a detection time point or during a detection time period, or according to a level variation of the operation signal output pin PN at a detection time point or during a detection time period, to generate an open detection signal Fault.

When the operation signal output pin PN and the power switch SW3 is properly connected, charges provided by the predetermined current Ip will be slowly accumulated in a parasitic capacitor between the gate and the source of the power switch SW3. On the other hand, when the connection between the operation signal output pin PN and the power switch SW3 is open, charges provided by the predetermined current Ip will be rapidly accumulated at the operation signal output pin PN because the parasitic capacitor of the power switch SW3 is disconnected. Thus, whether the connection between the operation signal output pin PN and the power switch SW3 is open can be determined by sensing the level of the operation signal output pin PN, and an open detection signal Fault can be generated accordingly. Note that, during normal operation, the operation signal output pin PN is used for outputting the operation signal GATE to control the power switch SW3, and therefore, the detection time point or the detection time period for providing the predetermined current Ip and determining whether the connection between the operation signal output pin PN and the power switch SW3 is open is preferably at a time point or during a time period when the operation signal GATE turns OFF the power switch SW3, so as not to impact the normal operation. The operation will be described in detail later with reference to FIGS. 5 and 6.

Figure 3:
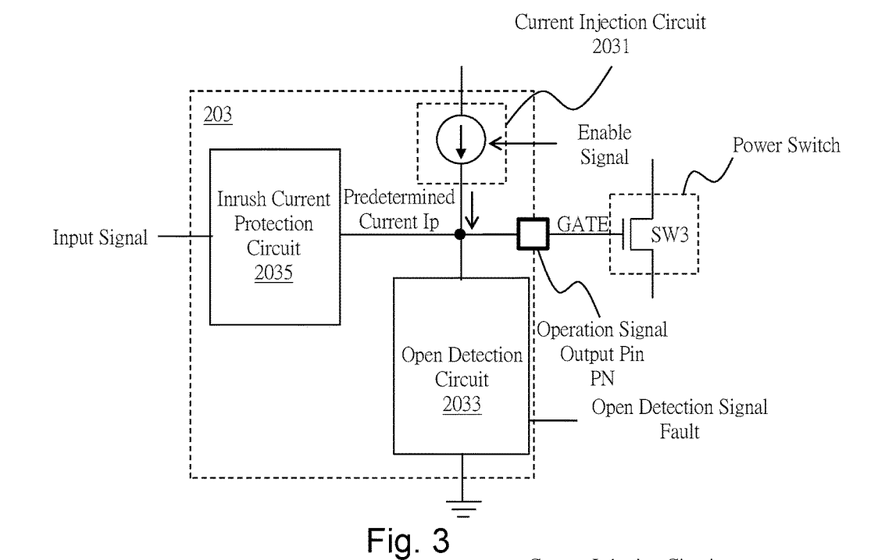
FIG. 3 shows another embodiment of the power switch control circuit 203 according to the present invention.

FIG. 3 shows another embodiment of the power switch control circuit 203 according to the present invention. As shown in FIG. 3, the power switch control circuit 203 generates the operation signal GATE at the operation signal output pin PN therein according to the input signal, to control the power switch SW3. The power switch control circuit 203 includes the current injection circuit 2031, the open detection circuit 2033, and an inrush current protection circuit 2035. In this embodiment, the current injection circuit 2031 is connected to the operation signal output pin PN, and provides the predetermined current Ip to the operation signal output pin PN according to the enable signal Enable. The current injection circuit 2031 is for example but not limited to a current source circuit. When the enable signal Enable enables the current source circuit, the current source circuit provides the predetermined current Ip to the operation signal output pin PN. In another embodiment, the current injection circuit 2031 may include a current source circuit and a switch connected in series, and when the enable signal Enable turns ON the switch, the current source circuit provides the predetermined current Ip to the operation signal output pin PN. The open detection circuit 2033 is coupled to the current injection circuit 2031. The open detection circuit 2033 determines whether a connection between the operation signal output pin PN and the power switch SW3 is open according to a level of the operation signal output pin PN at a detection time point or during a detection time period, or according to a level variation of the operation signal output pin PN during a detection time period, to generate an open detection signal Fault. The difference between this embodiment and the embodiment shown in FIG. 2 is that, in this embodiment, the power switch control circuit 203 further includes the inrush current protection circuit 2035, which is coupled to the operation signal output pin PN, for clamping a level of the operation signal output pin PN when the predetermined current Ip is provided to the operation signal output pin PN, such that the level does not exceed an upper limit. The inrush current protection circuit 2035 prevents the power switch SW3 from being erroneously turned ON by the high level at the operation signal output pin PN, when the operation signal output pin PN is connected to the power switch SW3 normally and the predetermined current Ip is provided to the operation signal output pin PN. The inrush current protection circuit 2035 for example can be, but is not limited to a clamper circuit. The clamper circuit may be embodied in various ways as well known by those skilled in this art, and any type of clamper can be used as the inrush current protection circuit 2035.

Figure 4:
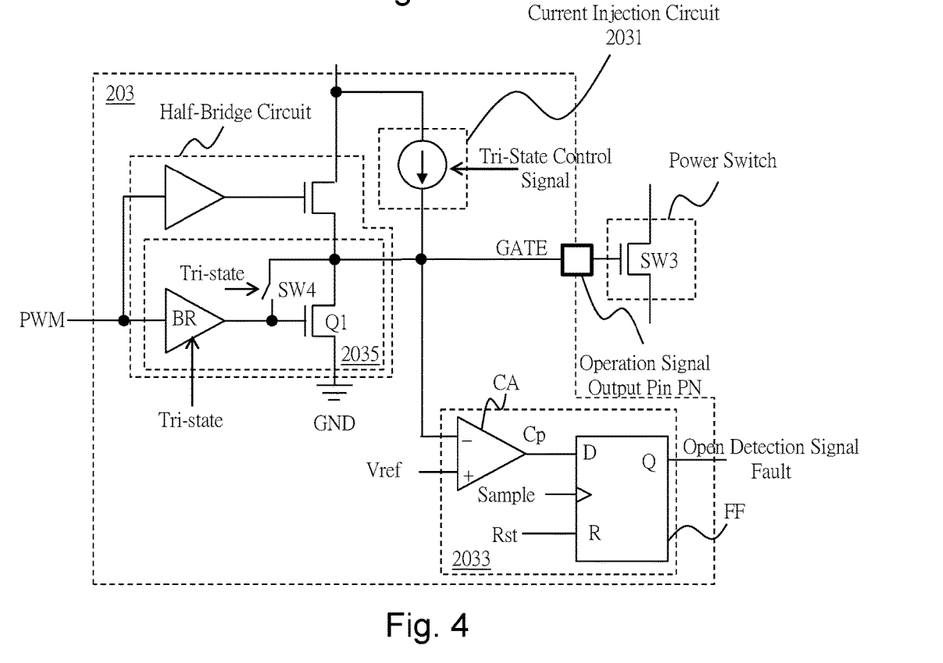
FIG. 4 shows a more specific embodiment of the power switch control circuit 203 according to the present invention.

FIG. 4 shows a more specific embodiment of the power switch control circuit 203 shown in FIG. 2 according to the present invention. As shown in FIG. 4, the power switch control circuit 203 generates an operation signal GATE at an operation signal output pin PN therein according to an input signal, to control a power switch SW3. The input signal is for example but not limited to a pulse width modulation (PWM) signal. The PWM signal is typically used as a control signal of a switching regulator, as well known by those skilled in the art. The power switch control circuit 203 includes the current injection circuit 2031, the open detection circuit 2033, and an inrush current protection circuit 2035. In this embodiment, the enable signal Enable is for example but not limited to a tri-state control signal Tri-state, which can control a state of a controlled circuit to be an enable state or a high impedance state. The current injection circuit 2031 is connected to the operation signal output pin PN, and provides the predetermined current Ip to the operation signal output pin PN according to the tri-state signal Tri-state. The current injection circuit 2031 is for example but not limited to a current source circuit. When the tri-state signal Tri-state enables the current source circuit, the current source circuit provides the predetermined current Ip to the operation signal output pin PN. In another embodiment, the current injection circuit 2031 may include a current source circuit and a switch connected in series, and when the tri-state signal Tri-state turns ON the switch, the current source circuit provides the predetermined current Ip to the operation signal output pin PN. The open detection circuit 2033 is coupled to the current injection circuit 2031. The open detection circuit 2033 determines whether the connection between the operation signal output pin PN and the power switch SW3 is open according to a level of the operation signal output pin PN at a detection time point or during a detection time period, or according to a level variation of the operation signal output pin PN during a detection time period, to generate an open detection signal Fault.

Still referring FIG. 4, in this embodiment, the open detection circuit 2033 includes: a comparison circuit CA and a latch circuit FF. The comparison circuit CA is coupled to the operation signal output pin PN, and it compares the level of the operation signal output pin PN with a reference level Vref, to generate a comparison signal Cp indicating whether the connection between the operation signal output pin PN and the power switch SW3 is open. As explained in the above, the detection time point or the detection time period for providing the predetermined current Ip and determining whether the connection between the operation signal output pin PN and the power switch SW3 is open is preferably at the time point or during the time period when the operation signal GATE turns OFF the power switch SW3; however, the detection result needs to be held. Therefore, in this embodiment, the comparison circuit CA is coupled to the latch circuit FF; the latch circuit FF is for latching the comparison signal Cp to generate the open detection signal Fault. In this embodiment, the latch circuit FF is for example but not limited to a D-type flip-flop as shown in the figure. The D-type flip-flop has a data pin D for receiving the comparison signal Cp, so as to latch the comparison signal Cp. A clock pin of the latch circuit FF receives a detection trigger signal Sample, to trigger an open detection timing. A reset pin R receives a reset signal Rst, to reset the open detection procedure. The reset signal Rst is for example but not limited to being synchronized with the PWM signal. The output pin Q generates the open detection signal Fault. The D-type flip flop shown in the figure is for illustrative purpose, not for limiting the scope of the present invention. The latch circuit FF may be embodied in any form which is able to hold or store the output from the comparison circuit CA. The operation mechanism of the flip-flop is well known by those skilled in the art, so details thereof are omitted here.

Still referring FIG. 4, in this embodiment, the inrush current protection circuit 2035 is coupled to the operation signal output pin PN, for clamping a level of the operation signal output pin PN when the predetermined current Ip is provided to the operation signal output pin PN, such that the level does not exceed an upper limit. The inrush current protection circuit 2035 prevents the power switch SW3 from being erroneously turned ON by the high level at the operation signal output pin PN, when the operation signal output pin PN is connected to the power switch SW3 normally and the predetermined current Ip is provided to the operation signal output pin PN. The inrush current protection circuit 2035 for example can be, but is not limited to a clamper circuit.

In one embodiment, as shown in the figure, the inrush current protection circuit 2035 includes for example but not limited to a lower switch Q1 and a switch SW4, wherein the lower switch Q1 is also a part of a half-bridge circuit (to be explained later) in the power switch control circuit 203. The switch SW4 is electrically connected between a gate and a current inflow terminal (drain, when the switch SW4 is an NMOS transistor) of the lower switch Q1. The switch SW4 is controlled by the tri-state control signal Tri-state (the enable signal Enable). When the tri-state control signal Tri-state is at the enable state, the switch SW4 is turned ON, and the lower switch Q1 behaves like a diode and forms a diode clamper circuit, guiding the excess charges (which are the cause of the "inrush current") above the clamped level to flow to the ground level GND through the diode clamper circuit. That is, because the forward conduction voltage of a diode is 0.7V, the voltage difference between the operation signal output pin PN and the ground level GND is limited to be not higher than 0.7V, which is the aforementioned upper limit. In addition, the tri-state control signal Tri-state also controls a buffer BR to be in a high impedance state, such that the inrush current does not flow reversely to the left side (the input side) of the buffer BR, to protect the other circuits and devices in the power switch control circuit 203.

In the power switch control circuit 203, in order to generate the operation signal GATE with proper high and low levels so as to be capable of driving the power switch SW3, a driver circuit is included. The driver circuit includes the aforementioned half-bridge circuit. The half-bridge circuit includes: an upper switch and the lower switch Q1 coupled to a common node; an upper buffer, which is configured to operably control the upper switch according to the input signal; and a lower buffer, which is configured to operably control the lower switch Q1 according to the input signal, wherein the upper switch and the lower switch are transistors with opposite conductive types, or are transistors with a same conductive type wherein one and only one of the upper buffer and the lower buffer is an inverter buffer.

Figure 5:
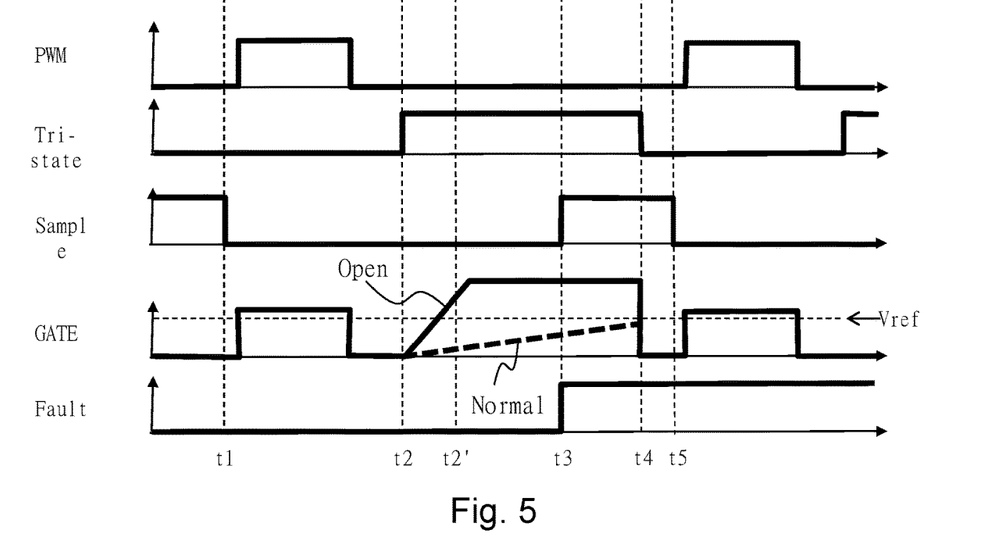
FIG. 5 shows a schematic diagram of signal waveforms of a pulse width modulation (PWM) signal PWM, a tri-state control signal Tri-state, a detection trigger signal Sample, an operation signal GATE, and an open detection signal Fault according to the present invention.

FIG. 5 shows a schematic diagram of signal waveforms of the pulse width modulation (PWM) signal PWM, the tri-state control signal Tri-state, the detection trigger signal Sample, the operation signal GATE, and the open detection signal Fault according to the present invention. The power switch control circuit 203 generates the operation signal GATE according to the pulse width modulation signal PWM, to control the power switch SW3. For example, when the pulse width modulation signal PWM is at the high level, the power switch control circuit 203 generates the operation signal GATE at the high level, to turn ON the power switch SW3. The tri-state control signal Tri-state triggers or stops the open detection procedure. As explained in the above, the open detection procedure preferably does not interfere with the normal operation, and thus the open detection procedure (including providing the predetermined current Ip and detecting the level of the operation signal output pin PN) is preferably performed during the time period wherein the operation signal GATE turns OFF the power switch SW3. As shown in FIG. 5, the tri-state control signal Tri-state for example triggers the start of the open detection procedure by a rising edge thereof at time point t2, and the tri-state control signal Tri-state for example ends the open detection procedure by a falling edge thereof at time point t4. In one embodiment, the tri-state control signal Tri-state may be generated according to the pulse width modulation PWM. For example, when the pulse width modulation signal PWM switches to the low level or after a period of time from when the pulse width modulation signal PWM switches to the low level, the tri-state control signal Tri-state changes to the high level, to trigger the open detection procedure to start; and the when or before the pulse width modulation signal PWM switches to the high level, the tri-state control signal Tri-state changes to the low level, to stop the open detection procedure.

Still referring FIG. 5, the detection trigger signal Sample indicates the detection time point or the detection time period. When the tri-state control signal Tri-state triggers the open detection procedure to start, the predetermined current Ip is provided to the operation signal output pin PN. As explained in the above, when the connection between the operation signal output pin PN and the power switch SW3 is normal, charges provided by the predetermined current Ip will be slowly accumulated in the parasitic capacitor between the gate and the source of the power switch SW3, and thus the level of the operation signal output pin PN increases slowly, as indicated by a dashed bold line shown in the figure. On the other hand, when the connection between the operation signal output pin PN and the power switch SW3 is open, charges provided by the predetermined current Ip will be rapidly accumulated at the operation signal output pin PN because the parasitic capacitor of the power switch SW3 is disconnected from the operation signal output pin PN, and thus, the level of the operation signal output pin PN increases rapidly, as indicated by a solid bold line shown in the figure. Therefore, after the tri-state control signal Tri-state triggers the open detection procedure, at a proper detection time point or within a proper detection time period, it can be determined as to whether the level of the operation signal output pin PN is too high with reference to a proper reference level Vref, so as to determine whether the connection between the operation signal output pin PN and the power switch SW3 is open, and to generate the open detection signal Fault accordingly.

Still referring to FIG. 5, as shown in the figure, when the detection trigger signal Sample changes from the low level to the high level at time point t3, a sampling window within the open detection procedure starts. When the detection trigger signal Sample changes from the high level to the low level at time points t1 and t5, the sampling window within open detection procedure ends. In one embodiment, the open detection circuit 2033 compares the level of the operation signal output pin PN (i.e., the level of the operation signal GATE) with the reference level Vref at the time point t3. At the time point t3, if the level of the operation signal output pin PN is higher than the reference level Vref, the connection between the operation signal output pin PN and the power switch SW3 is determined open. On the other hand, at the time point t3, if the level of the operation signal output pin PN is lower than the reference level Vref, the connection between the operation signal output pin PN and the power switch SW3 is determined normal.

In the aforementioned embodiment shown in FIG. 5, the open detection circuit 2033 determines whether the connection between the operation signal output pin PN and the power switch SW3 is open according to the level of the operation signal output pin PN (i.e., the level of the operation signal GATE) at the time point t3. The present invention is not limited to this embodiment. According to the present invention, there are various ways to determine whether the connection between the operation signal output pin PN and the power switch SW3 is open. For example, in other embodiments, the open detection circuit 2033 can determine whether the connection between the operation signal output pin PN and the power switch SW3 is open and generates the open detection signal Fault according to a highest level of the operation signal output pin PN during the detection time period, a level variation of the operation signal output pin PN during the detection time period, or a time length for the level of the operation signal output pin PN to achieve a predetermined level. The detection time period for example can be, but is not limited to a time period from time point t2 to time point t2'. In the detection time period from the time point t2 to the time point t2', the open detection circuit 2033 can determine whether the connection between the operation signal output pin PN and the power switch SW3 is open according to whether the highest level of the operation signal output pin PN (i.e., the highest level of the operation signal GATE) achieves a predetermined level during the detection time period, or according to whether the level variation (i.e., a slope of the level of the operation signal GATE versus time) of the operation signal output pin PN is too fast during the detection time period, or according to whether the time length for the level of the operation signal output pin PN to achieve the predetermined level is too short during the detection time period. If the open detection circuit 2033 determines the connection between the operation signal output pin PN and the power switch SW3 is open, in one embodiment, the open detection signal Fault is correspondingly switched from the low level to the high level.

Figure 6:
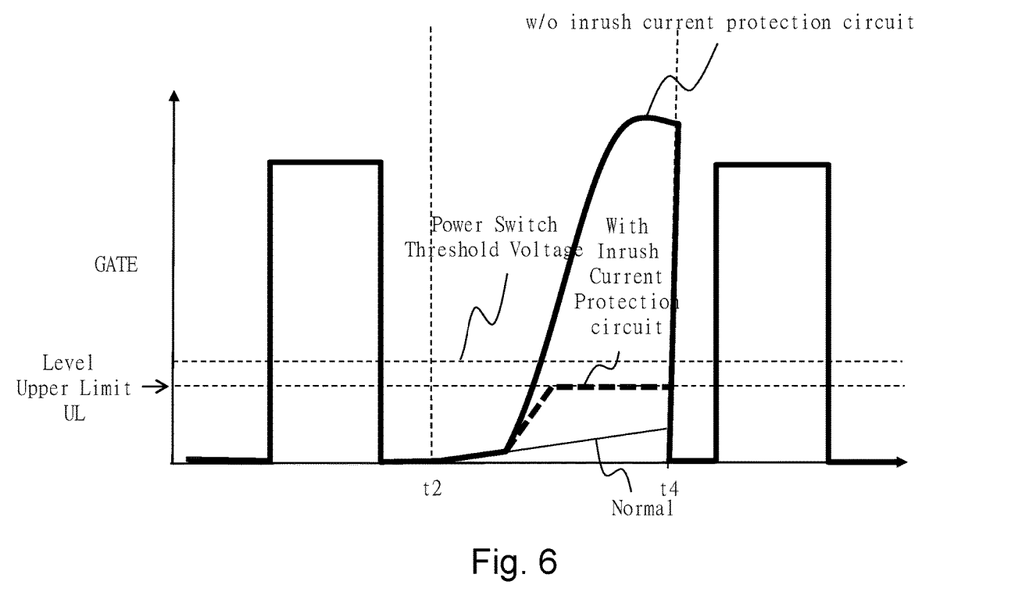
FIG. 6 shows a schematic diagram of signal waveforms of the operation signal GATE in different conditions according to the present invention.

FIG. 6 shows a schematic diagram of signal waveforms of the operation signal GATE in different conditions according to the present invention. Referring to the bold solid line (exaggerated) shown in FIG. 6, in the open detection procedure between time point t2 to time point t4, when the power switch control circuit 203 does not include the inrush current protection circuit 2035, and when the connection is normal, the charges accumulated at the operation signal output pin PN may cause the level of the operation signal output pin PN to rise above the threshold voltage of the power switch SW3 so that the power switch SW3 may be turned ON by mistake, and the inrush current may damage other circuits or devices inside the power switch control circuit 203 if the predetermined current Ip is too high. On the other hand, referring to the bold dashed line shown in FIG. 6, in the open detection procedure between time point t2 to time point t4, if the power switch control circuit 203 includes the inrush current protection circuit 2035, the level of the operation signal output pin PN (i.e., the level of the signal GATE) is clamped not to exceed an upper limit UL, so the power switch SW3 will not be erroneously turned ON, and the inrush current is prevented from flowing to and damaging other circuits or devices inside the power switch control circuit 203. As shown in the figure, the upper limit UL may be set to a level lower than a threshold voltage of the power switch SW3, to avoid turning ON the power switch SW3 in the open detection procedure. However, if the predetermined current Ip, the detection time point, and the reference level Vref are set properly, the inrush current will not be too high to turn ON the power switch SW3 or to damage the power switch control circuit 203, and in this case the inrush current protection circuit 2035 may be omitted.

When the open detection signal Fault indicates that the connection between the operation signal output pin PN and the power switch SW3 is open, a safety procedure may be triggered, for example to shut down the circuitry, to limit the electrical power, or simply to issue an alert, etc.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the meanings of the high level and the low level, and the meanings of the rising edge and the falling edge of a signal maybe interchangeable with corresponding amendments in the circuitry. For another example, the NMOS transistor and the PMOS transistor may be interchangeable with corresponding amendments in the circuitry. For another example, it is not limited for the resistor or the voltage divider circuit to be formed by passive devices, but it may be formed by other devices or circuits, such as transistors. For another example, when a circuit retrieves an external signal into the circuit (for example but not limited to the input signal), the signal may be subject to a voltage-to-current conversion, a current-to-voltage conversion, or a ratio conversion, etc. before it is processed by the circuit, and therefore, "performing an operation according to a certain signal" in the present invention, is not limited to performing an operation according to the signal itself, but can be performing an operation according to a signal which is converted from the signal. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the inrush current protection circuit 2035 can be applied to the embodiments shown in FIGS. 2 and 3, etc. In view of the foregoing, the spirit of the present invention should cover all such and other modifications and variations, which should be interpreted to fall within the scope of the following claims and their equivalents.

What is claimed is:

1. A power switch control circuit, configured to operably generate an operation signal at an operation signal output pin therein according to an input signal, so as to control a power switch, the power switch control circuit comprising:
   a current injection circuit, which is connected to the operation signal output pin, and is configured to operably provide a predetermined current to the operation signal output pin according to an enable signal;
   an open detection circuit, which is coupled to the current injection circuit, and is configured to operably determine whether a connection between the operation signal output pin and the power switch is open according to a level of the operation signal output pin at a detection time point or during a detection time period, or a level variation of the operation signal output pin during a detection time period, and to generate an open detection signal accordingly; and
   an inrush current protection circuit, which is coupled to the operation signal output pin, and is configured to operably clamp a level of the operation signal output pin when the predetermined current is provided to the operation signal output pin, such that the level does not exceed an upper limit;
   wherein the input signal is transmitted to the operation signal output pin through a driver circuit which includes a half-bridge circuit, wherein the half-bridge circuit includes:
      an upper switch and a lower switch connected at a common node;
      an upper buffer, which is configured to operably control the upper switch according to the input signal; and
      a lower buffer, which is configured to operably control the lower switch according to the input signal, wherein the upper switch and the lower switch are transistors with opposite conductive types, or are transistors with a same conductive type wherein one and only one of the upper buffer and the lower buffer is an inverter buffer;
   wherein the inrush current protection circuit includes:
      the lower switch; and
      a switch, which is electrically connected between a gate and a current inflow terminal of the lower switch, and is controlled by the enable signal;
      wherein when the enable signal is at an enable state, the lower switch forms a diode clamper circuit.

2. The power switch control circuit of claim 1, wherein the open detection circuit includes:
   a comparison circuit, which is coupled to the operation signal output pin, and is configured to operably compare the level of the operation signal output pin with a reference level, so as to generate a comparison signal indicating whether the connection between the operation signal output pin and the power switch is open; and
   a latch circuit, which is coupled to the comparison circuit, and is configured to operably latch the comparison signal to generate the open detection signal.

3. The power switch control circuit of claim 1, wherein the open detection circuit determines whether a connection between the operation signal output pin and the power switch is open and generates the open detection signal according to the level of the operation signal output pin at the detection time point, a highest level of the operation signal output pin during the detection time period, the level variation of the operation signal output pin during the detection time period, or a time length for the level of the operation signal output pin to achieve a predetermined level.

4. The power switch control circuit of claim 1, wherein the operation signal is a pulse width modulation (PWM) signal, and the operation signal is at a low level at the detection time point or during the detection time period.

* * * * *